United States Patent [19]
Lukas et al.

[11] Patent Number: 5,881,773
[45] Date of Patent: Mar. 16, 1999

[54] COMPLEMENTARY JOINTS TO MECHANICALLY AND REMOVABLY JOIN FLUID VALVE BODIES TOGETHER IN FLUID COMMUNICATION WITH ONE ANOTHER

[75] Inventors: Gus J. Lukas, Manitowoc, Wis.; Richard E. Berrend, Calumet, Conn.

[73] Assignee: Lube Devices, Inc., Manitowoc, Wis.

[21] Appl. No.: 989,531

[22] Filed: Dec. 12, 1997

[51] Int. Cl.⁶ ..................................................... F16K 11/10
[52] U.S. Cl. ........................................ 137/884; 285/124.5
[58] Field of Search .................................. 137/884, 270; 285/124.1, 124.5

[56] References Cited

U.S. PATENT DOCUMENTS 3,516,442  6/1970  Munroe ................................ 137/269 X

FOREIGN PATENT DOCUMENTS 2267009  3/1975  France ..................................... 137/884
2515050  10/1975  Germany ................................ 137/884

Primary Examiner—John Fox
Attorney, Agent, or Firm—Nilles & Nilles, S.C.

[57] ABSTRACT

Stacked valve bodies have adjacent sides pressed against one another and fluid bores extend through adjacent sides to place the bodies in fluid communication with one another. Resilient seals are around the bores and between adjacent sides so as to form fluid seals between adjacent sides. The bodies also each have opposite outer sides with partial grooves formed in the outer sides of the adjacent bodies. The partial grooves form a complete groove and central post in opposite sides of the adjacent bodies. A ring-like connecting member corresponds in shape to the complete groove and is adapted to be pressed in the complete groove and snugly around the post when the adjacent bodies are pressed together against the resiliency of the seals.

15 Claims, 2 Drawing Sheets

COMPLEMENTARY JOINTS TO MECHANICALLY AND REMOVABLY JOIN FLUID VALVE BODIES TOGETHER IN FLUID COMMUNICATION WITH ONE ANOTHER

BACKGROUND OF THE INVENTION

1. Field of the Invention

The invention relates generally to the stacking or ganging of fluid valve bodies together so they can be placed in fluid communication with one another. More specifically, the invention relates to mechanical devices between adjacent valve bodies for removably fastening the bodies together.

2. Discussion of the Related Art

Various mechanical means have been proposed to secure pumps or motors together in sandwiched or stacked relationship and which permit disassembly of the members from one another. For example, tie rods have been used which extend through the separate pumps or motors, see U.S. Pat. No. 3,681,919, issued Aug. 8, 1972 to Forster. U.S. Pat. No. 4,468,174, which issued Aug. 28, 1984 to Pryor, discloses pin 40 and slot 42 aligning means between adjacent individual pump stages which are then held together by bolt means 62. U.S. Pat. No. 4,535,821, issued Aug. 20, 1985 to Anderson, shows stacked valve bodies that are held together by complicated joints using locking beams of H-shaped cross section which are insertable in grooves 70 and then the bodies are bolted together.

SUMMARY OF THE INVENTION

The present invention provides complementary joints between valve bodies so the latter can be stacked or ganged together in fluid communication with one another and which can be readily assembled or disassembled. The valve bodies have fluid passages so that each can communicate with one another and these passages have resilient seals between adjacent sides of said bodies and around the bores thereof for sealing between the sides when the latter are pressed together against the resiliency of these seals. The complementary joints provided by the present invention are formed in the outer adjacent wall surfaces of the bodies and these complementary grooves between the outer surfaces of the bodies form spaced apart groove joints when said bodies are in juxtaposition. Another aspect of the invention relates to these grooves are formed as being semicircular in shape and these grooves in adjacent bodies form a complete groove joint with a central post between said bodies. A ring-like member corresponding in shape to the groove joint is adapted to fit therein and firmly around the central post when adjacent sides are pressed toward one another against the resiliency of the seals therebetween. The resiliency of the seals tend to urge the adjacent bodies apart causing the ring-like member to snugly engage its corresponding central post of the semicircular groove.

Other aspects of the invention relate to various forms of groove patterns in adjacent bodies. The arrangement is such that the ring-like members or other forms of connectors are pressed in corresponding grooves in adjacent valve bodies and are held therein by the resiliency of the seals therebetween.

DESCRIPTION OF THE PREFERRED EMBODIMENT

Figure 1:
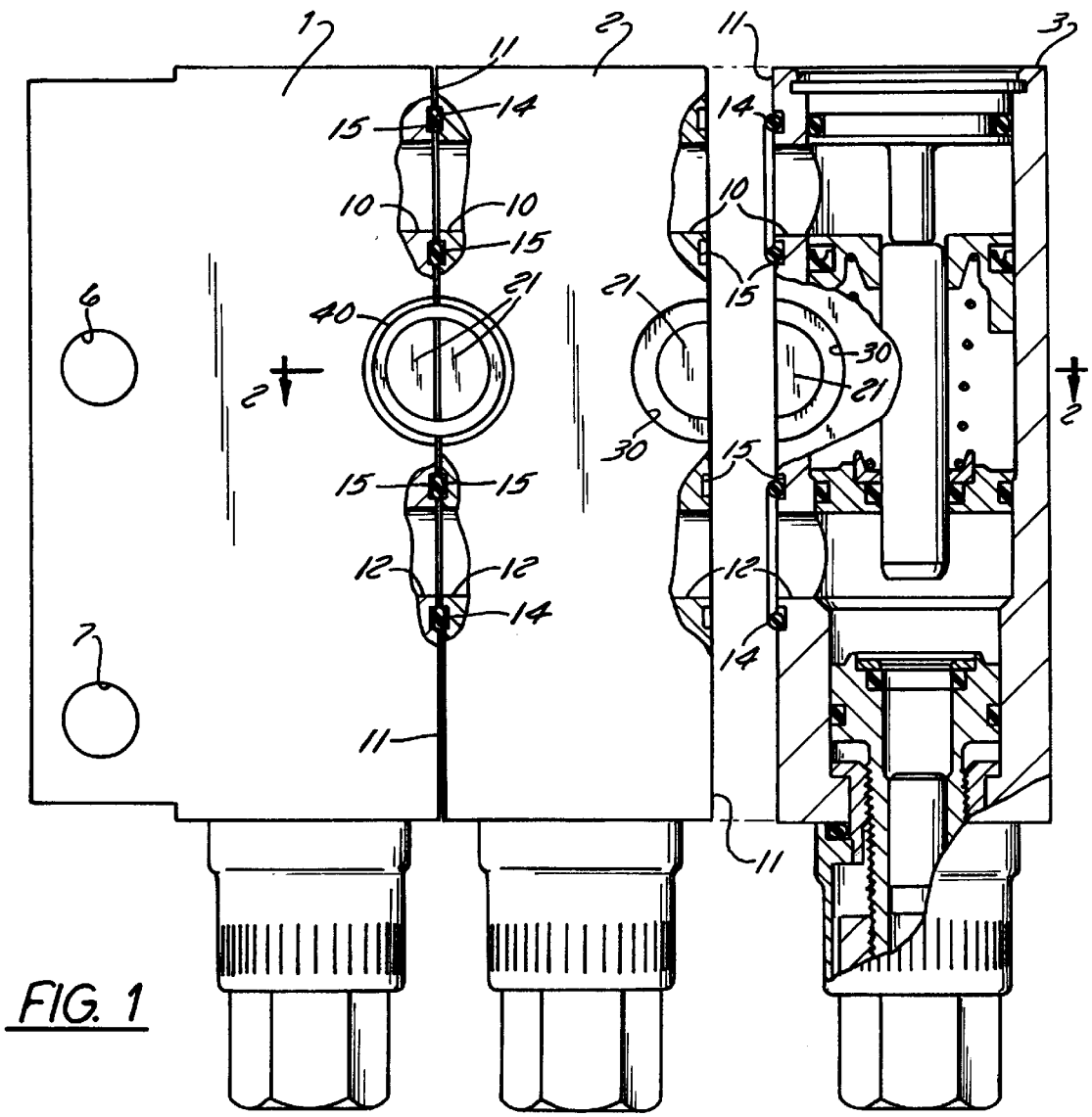
FIG. 1 is an elevational view of three valve bodies, two of which are shown as being mechanically joined together and the third one shown as being separated and partially in section.

The present invention will be shown and described in connection with pump and valve bodies as shown in the co-pending United States patent application Ser. No. 08/987,595, filed Dec. 9, 1997 by the present inventors. While these particular valve bodies have been shown as an example of use with the present invention, other forms of valve bodies having fluid communication with one another may be used with the present invention.

The general arrangement shown for purposes of illustrating the present invention include a primary multiple body 1, an add-on body 2, and an end body 3, it being understood that other numbers of bodies may be stacked together. The primary body 1 has holes 6 and 7 extending therethrough by means of which the assembled bodies can be fastened to a suitable support (not shown). Generally, the three bodies are internally similar in that they include a supply bore 10 for compressed air or other actuating fluid, and they also each have a fluid inlet bore 12 for the fluid to be metered, such as oil for example. These bores 10 and 12 are located in the adjacent sides 11 of the valve bodies and thus place the valve bodies in fluid communication with one another. Resilient O-ring seals 14 are located in corresponding circular grooves 15 cut into adjacent sides 11 of the valve bodies and act to receive the resilient seals 14 such as, for example, O-ring seals made of rubber or elastomer material. Other cross-sectional forms of seals may be used, such as square or rectangular, and formed as by being molded or die cut, for example. When the bodies are pressed or squeezed together, as will be described, the resilient seals 14 act as springs which tend to urge the bodies apart slightly (as shown by the gap 18—FIG. 4) against the inherent resiliency of the seals 14.

Figure 2:
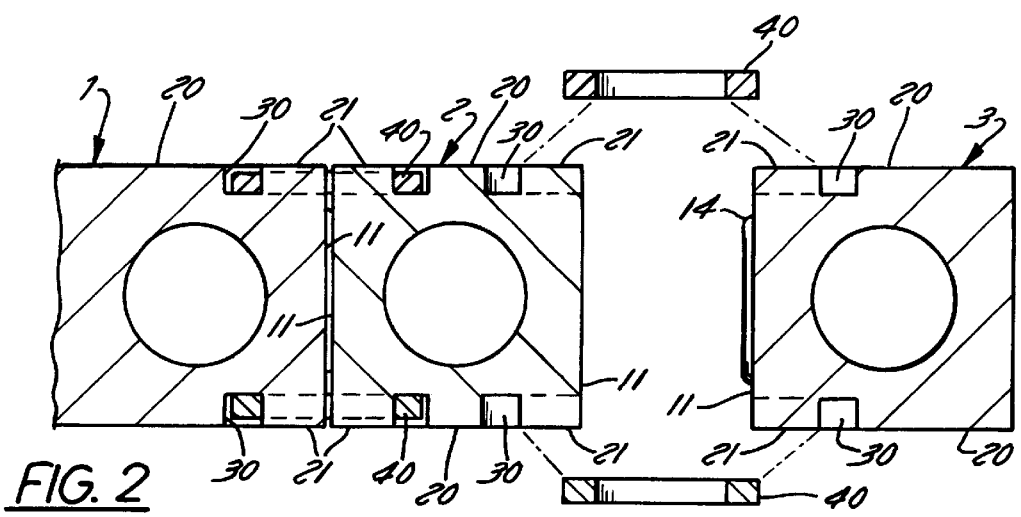
FIG. 2 is a generally sectional view taken along the line 2—2 in FIG. 1 and showing two ring-like members in exploded position.
Figure 3:
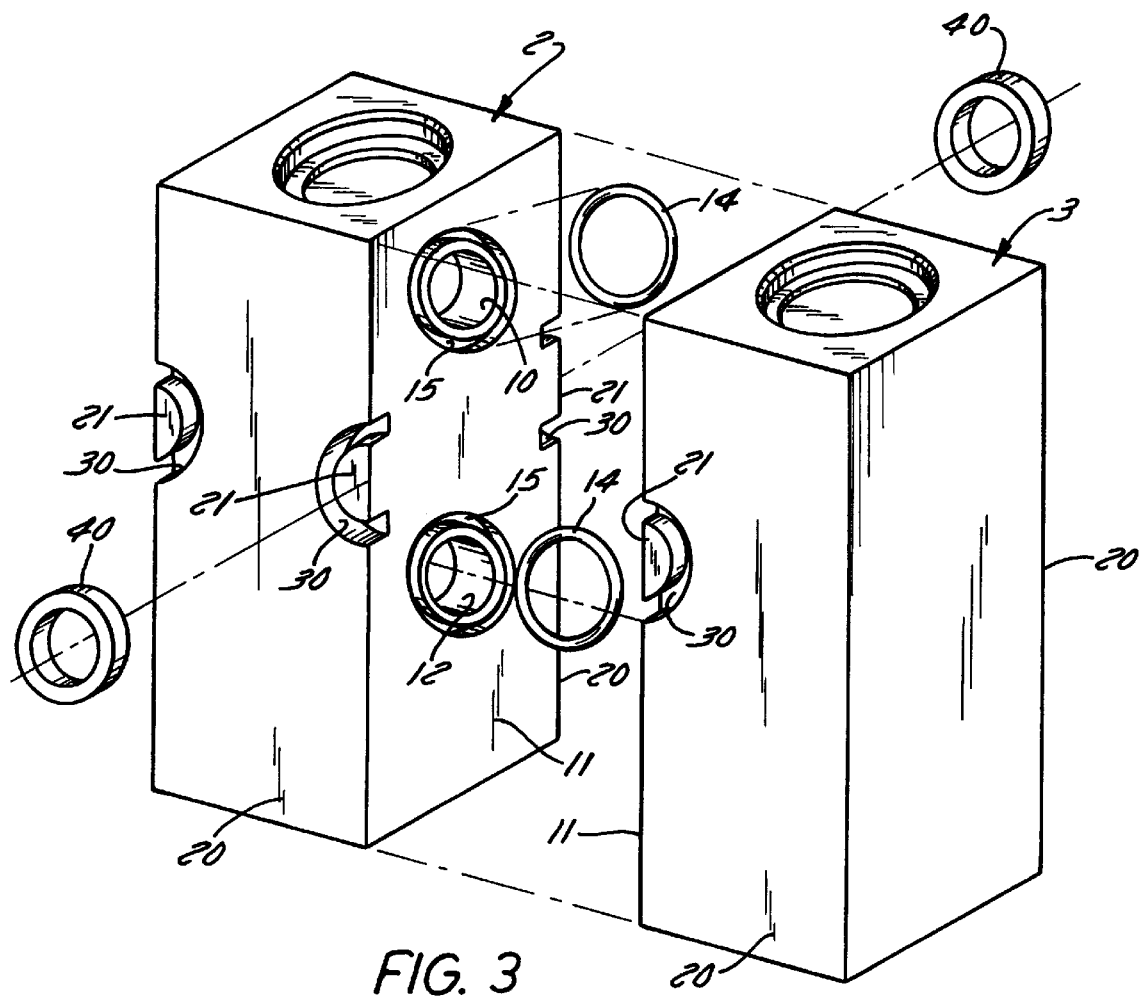
FIG. 3 is a perspective exploded view of two of the bodies shown in FIG. 1, certain parts being shown as removed for the sake of clarity and other parts such as rings and seals being shown in exploded position.

The present invention provides complementary joints to mechanically and removably join the fluid valve bodies together so that they can be in fluid communication with one another as above indicated. These complementary joints have been shown as partial, semicircular grooves 30, that is, of square cross section formed in adjacent outer sides 20 of the bodies so that when the two adjacent bodies are placed in juxtaposition (FIGS. 1 and 2), the two semicircular grooves 30 adjacent one another form a complete circular groove defining a central post 21 (FIGS. 1 and 2). A connecting member in the form of a circular, hardened steel ring 40 of square cross section is adapted to then be pressed snugly into the complete circular groove when the adjacent valve bodies are pressed toward one another and against the resiliency of the seals. The hardened steel ring 40 tightly engages and surrounds the central post portion 21. One such complementary joint is provided on each of the opposite outer sides of the adjacent valve bodies.

Other forms and shapes of grooves and their complementary connecting members may be used, such as, for example, rectangular, oval, or I-shaped grooves or members.

Figure 4:
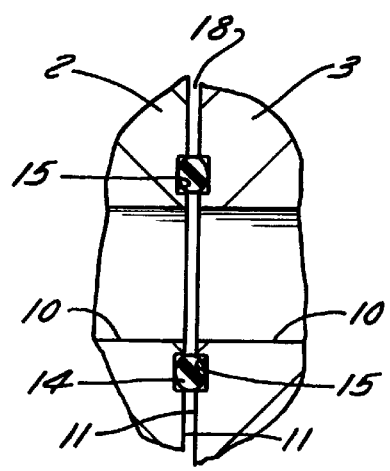
FIG. 4 is a cross-sectional view of an O-ring seal in its joint as shown in FIG. 1, but on an enlarged scale to show the small gap between the bodies.

The arrangement is such that the valve bodies are firmly held together against the resiliency of the O-ring seal with a small gap 18 between them (see FIG. 4). When it is desired to disassemble the stacked bodies it is only necessary to firmly grasp the adjacent bodies and press them even more tightly together against the resiliency of the seals, and thereby tending to cause the rings to pop out or otherwise cause the connecting rings to be removed from their grooves.

If it is desired to make the assembly of the bodies more permanent or "tamper-proof," the center post 21 can be staked over ring 40 in a small area, preferably on center lines which are 90° to the gap 18.

What is claimed is:

1. Stacked valve bodies having adjacent sides pressed against one another, fluid bores through said adjacent sides so as to place said bodies in fluid communication with one another, resilient seals around said bores and between said adjacent sides so as to form fluid seals between said adjacent sides, said bodies also each having opposite outer sides, partial grooves formed in said outer sides of adjacent bodies, the partial grooves in adjacent bodies together forming a complete annular groove and a central post in opposite sides of said adjacent bodies, a connecting member corresponding in shape to said complete annular groove and adapted to be pressed snugly in said complete annular groove and snugly around said post when said adjacent bodies are pressed together against the resiliency of said seals.

2. The bodies set forth in claim 1 further characterized in that said complete annular grooves are of square cross section, and said connecting members are of square cross section.

3. The bodies as described in claim 1 further characterized in that said resilient seals are O-rings of circular cross section.

4. The bodies as described in claim 2 further characterized in that said resilient seals are O-rings of circular cross section.

5. Stacked valve bodies having adjacent sides pressed against one another, fluid bores through said adjacent sides so as to place said bodies in fluid communication with one another, resilient seals around said bores and between said adjacent sides so as to form fluid seals between said adjacent sides, said bodies also each having opposite outer sides, a semicircular groove formed in each of said outer sides of adjacent bodies, the grooves in adjacent bodies together forming a complete circular annular groove in opposite sides of said adjacent bodies, the circular annular groove defining a circular central post; an annular ring member corresponding in size and shape to said complete circular annular groove and adapted to be pressed snugly in said complete groove and around said central post when said adjacent bodies are pressed together against the resiliency of said seals.

6. The bodies set forth in claim 5 further characterized in that said complete circular annular grooves are of square cross section, and said ring members are of square cross section.

7. The bodies as described in claim 5 further characterized in that said resilient seals are O-rings of circular cross section.

8. The bodies as described in claim 6 further characterized in that said resilient seals are O-rings of circular cross section.

9. Stacked valve bodies having adjacent sides pressed against one another, fluid bores through said adjacent sides so as to place said bodies in fluid communication with one another, resilient seals around said bores and between said adjacent sides so as to form fluid seals between said adjacent sides, said bodies also each having opposite outer sides, partial grooves formed in said outer sides of adjacent bodies, the partial grooves in adjacent bodies together forming a complete annular groove in opposite sides of said adjacent bodies, said complete annular groove defining a central post in said adjacent bodies, a rigid annular ring-like member corresponding in shape to said complete groove and adapted to be pressed in said complete annular groove and snugly around said post when said adjacent bodies are pressed partially but not completely together against the resiliency of said seals, whereby said bodies can be further pressed together against the resiliency of said seals to permit removal of said ring-like member from their respective complete annular grooves.

10. The combination as described in claim 9 further characterized in that the diameter of said complete annular grooves is greater than the external diameter of said ring-like member whereby said bodies can be pressed closer together against seal resiliency for said removal of said ring-like member.

11. A valve assembly comprising:
 (A) first and second stacked valve bodies having adjacent sides pressed against one another, fluid bores being formed through said adjacent sides so as to place said valve bodies in fluid communication with one another, said valve bodies also each having opposite outer sides extending at least generally perpendicularly from said adjacent sides, facing partial grooves being formed in said outer sides of said valve bodies at junctures between said outer sides and said adjacent sides, the partial grooves in said valve bodies together forming 1) a complete central post in said opposite sides of said valve bodies and 2) a complete annular groove which surrounds said central post;
 (B) resilient seals around said bores and between said adjacent sides of said valve bodies so as to form fluid seals between said adjacent sides, said resilient seals biasing said valve bodies away from one another; and
 (C) a connecting member corresponding in shape to said complete annular groove and adapted to be pressed snugly in said complete annular groove and snugly around said post when said valve bodies are pressed together against the resiliency of said seals, said seals biasing first and second portions of said post away from one another to apply tension to said connecting member, thereby preventing removal of said connecting member from said complete annular groove.

12. A valve assembly as defined in claim 11, wherein said connecting member comprises a relatively rigid ring.

13. A valve assembly as defined in claim 12, wherein said ring is made from hardened steel.

14. A valve assembly as defined in claim 11, wherein said connecting member is adapted to be pressed snugly in said complete annular groove and snugly around said post when said valve bodies are pressed partially but not completely together against the resiliency of said resilient seals, whereby said valve bodies can be further pressed together against the resiliency of said resiliency seals to permit removal of said ring from said complete annular groove.

15. A valve assembly comprising:
(A) first and second stacked valve bodies having adjacent sides pressed against one another, fluid bores being formed through said adjacent sides so as to place said first and second valve bodies in fluid communication with one another, said first and second valve bodies also each having opposite outer sides extending at least generally perpendicularly from said adjacent sides, facing semi-circular partial grooves being formed in said outer sides of said first and second valve bodies at junctures between said outer sides and said adjacent sides, the partial grooves in said first and second valve bodies being of square cross section and together forming 1) a complete central circular post in said opposite sides of said adjacent bodies, said post being formed from first and second semi-circular portions, each of which is disposed on one of said valve bodies, and 2) a complete annular circular groove which surrounds said post;
(B) resilient seals around said bores and between said adjacent sides of said first and second valve bodies so as to form fluid seals between said adjacent sides, said resilient seals biasing said first and second valve bodies away from one another; and
(C) a hardened circular annular steel ring which is of square cross section and which is adapted to be pressed snugly in said complete annular circular groove and snugly around said post when said first and second valve bodies are pressed partially but not completely together against the resiliency of said resilient seals, whereby said valve bodies can be further pressed together against the resiliency of said seals to permit removal of said ring from said complete annular circular groove.

* * * * *